United States Patent
Liu et al.

(10) Patent No.: US 10,616,169 B2
(45) Date of Patent: Apr. 7, 2020

(54) SYSTEMS, METHODS, AND APPARATUS FOR POST CONTENT SUGGESTIONS

(71) Applicant: Facebook, Inc., Menlo Park, CA (US)

(72) Inventors: Tony Hsien-yu Liu, Palo Alto, CA (US); Yuankai Ge, San Mateo, CA (US); Barton David Smith, New York, NY (US); Paritosh Aggarwal, Sunnyvale, CA (US); Daniel Dinu, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 1001 days.

(21) Appl. No.: 14/589,886

(22) Filed: Jan. 5, 2015

(65) Prior Publication Data

US 2016/0197870 A1 Jul. 7, 2016

(51) Int. Cl.
*H04L 12/58* (2006.01)
*G06Q 50/00* (2012.01)
*H04L 12/18* (2006.01)

(52) U.S. Cl.
CPC ............ *H04L 51/32* (2013.01); *G06Q 50/01* (2013.01); *H04L 12/1822* (2013.01)

(58) Field of Classification Search
CPC ......... H04L 51/32; H04L 12/58; H04L 67/22; G06Q 50/01
USPC .......................................................... 709/106
See application file for complete search history.

(56) References Cited

U.S. PATENT DOCUMENTS

| | | | | |
|---|---|---|---|---|
| 8,214,431 B2* | 7/2012 | Miyajima et al. | ...... | H04L 67/22 706/46 |
| 8,856,232 B1* | 10/2014 | Swerdlow | .............. | G06Q 10/10 709/204 |
| 8,903,921 B1* | 12/2014 | Snow | ..................... | G06Q 50/01 709/206 |
| 9,282,073 B1* | 3/2016 | Avital | .................... | H04L 51/02 |
| 2006/0047579 A1* | 3/2006 | Dresden | ................. | G06Q 10/00 705/14.54 |
| 2006/0253316 A1* | 11/2006 | Blackshaw | ....... | G06F 17/30867 705/7.32 |
| 2007/0208729 A1* | 9/2007 | Martino | ............ | G06Q 30/0255 |
| 2009/0222481 A1* | 9/2009 | Fisher | .................... | G06Q 10/06 |
| 2010/0180211 A1* | 7/2010 | Boyd | .................... | G06Q 10/10 715/751 |
| 2013/0304822 A1* | 11/2013 | Tetreault | ............ | H04N 21/2187 709/204 |
| 2014/0074856 A1* | 3/2014 | Rao | ........................ | G06Q 50/01 707/748 |
| 2014/0122622 A1* | 5/2014 | Castera | ................... | H04L 51/32 709/206 |
| 2014/0201296 A1* | 7/2014 | Patfield | .................. | H04L 51/04 709/206 |
| 2014/0214831 A1* | 7/2014 | Chi | ........................ | G06Q 50/01 707/737 |

(Continued)

*Primary Examiner* — Sm A Rahman
*Assistant Examiner* — Chen-Liang Huang
(74) *Attorney, Agent, or Firm* — Keller Jolley Preece

(57) ABSTRACT

Exemplary methods, apparatuses, and systems to make suggestions regarding posts are detailed. For example, in an embodiment, a social networking system receives a user post from a first user, publishes the user post on behalf of the first user, receives and tracks interactions by other users with the user post, analyzes the received and tracked interactions to determine suggestion regarding the post, and provides the suggestion regarding the user post to the first user in a graphical user interface.

20 Claims, 12 Drawing Sheets

(56) References Cited

U.S. PATENT DOCUMENTS

| | | | | |
|---|---|---|---|---|
| 2014/0280579 A1* | 9/2014 | Auger | H04W 4/21 | 709/204 |
| 2014/0344709 A1* | 11/2014 | Roberts | H04L 12/1859 | 715/752 |
| 2015/0067048 A1* | 3/2015 | Kannan | H04L 65/40 | 709/204 |
| 2015/0100509 A1* | 4/2015 | Pappas | G06F 17/30867 | 705/319 |
| 2015/0193889 A1* | 7/2015 | Garg | G06Q 50/01 | 705/14.49 |
| 2015/0195219 A1* | 7/2015 | T S | H04L 51/00 | 709/204 |
| 2015/0213041 A1* | 7/2015 | Das | G06F 16/9566 | 707/723 |
| 2015/0294358 A1* | 10/2015 | Galadari | G06Q 30/0257 | 705/14.55 |
| 2015/0312632 A1* | 10/2015 | Hoctor | H04N 21/251 | 725/14 |
| 2015/0347432 A1* | 12/2015 | Tsai | G06F 17/3089 | 715/202 |
| 2016/0042253 A1* | 2/2016 | Sawhney | G06K 9/6255 | 382/190 |
| 2016/0048900 A1* | 2/2016 | Shuman | G06Q 30/0631 | 705/7.33 |
| 2016/0057154 A1* | 2/2016 | Ferguson | H04L 63/104 | 726/7 |
| 2016/0063005 A1* | 3/2016 | Sisbot | H04L 67/10 | 707/754 |
| 2016/0125451 A1* | 5/2016 | Garg | G06Q 30/0243 | 705/14.42 |
| 2016/0217784 A1* | 7/2016 | Gelfenbeyn | G10L 15/22 | |
| 2017/0270126 A1* | 9/2017 | Boucher | G06F 17/3064 | |

* cited by examiner

Complete Page Info

PROGRESS
301

ADD A PROFILE
PICUTRE
303

ADD A
COVER
PHOTO
305

ADD A
DESCRIPTION
307

ADD
CONTACT
INFORMAT
309

PAGE CONTENT 311

POST
ACTIONS
313

Update Status
Share the latest on

Add Photo/Video

Create Offer

Crea
Eve

Good news! Your previous post is more engaging than you other posts. You can boost it to get mo comments.

POST SUGGESTION
315

FIG. 3

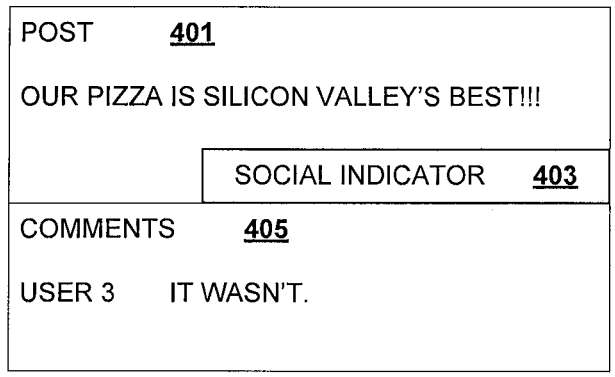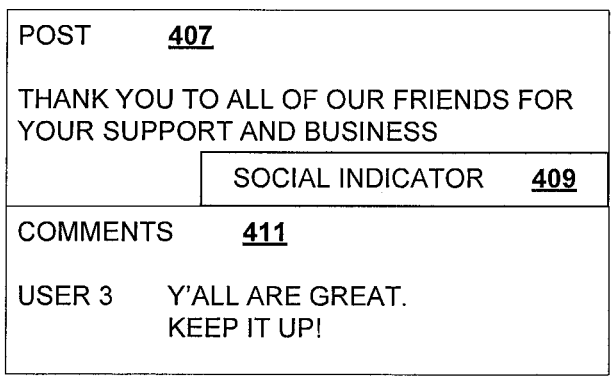
FIG. 4

Post Engaging Images and Videos
Rich media like photos and videos get more attention and help your message stand out.

Post Regularly
We recommend posting at least 1-2 times per week. Stay in regular contact with fans by creating a conv calendar.

Encourage interaction, ask questions
Engage your audience in a two-way conversation and show you value their ideas by posting questions to g

Keep your post succinct
Be succinct and conversational. We recommend posts between 100-250 characters to attract more eng

Entice your audience
Entice your fans to click on a link with a short caption telling them why they should click.

Make your post personal
Use language that your audience would use and treat your audience as friends.

FIG. 8

| TRIGGER SUGGESTION RULE SET 715 | | | | |
|---|---|---|---|---|
| TRIGGER 901 | SUGGESTION 903 | SUGGESTION COUNT 905 | NO SUGGESTION INDICATION 907 | TRIGGER COUNT 909 |
| POST WITHOUT PICTURE | ADD PICTURE | 1 | N | 2 |
| POST WITHOUT PICTURE | INCLUDE WEBSITE LINK | 1 | Y | 2 |
| POST WITH ALL CAPS | ALL CAPS TEND TO HAVE NEGATIVE FEEDBACK | 0 | N | 0 |
| ⋮ | ⋮ | ⋮ | ⋮ | ⋮ |

FIG. 9

SYSTEMS, METHODS, AND APPARATUS FOR POST CONTENT SUGGESTIONS

FIELD

The various embodiments described herein relate to post content. In particular, the embodiments relate to suggesting post content to a user.

BACKGROUND

Social networking systems enable users to interact with various objects represented within the social network. For example, a social networking system allows users to designate other users or entities as connections (or otherwise connect to, or form relationships with, other users or entities), contribute and interact with their connections, post media or commentary, share links to external content, use applications, join groups, list and confirm attendance at events, invite connections, and perform other tasks that facilitate social interaction. External applications also use the services of a social networking system to allow authenticated users to incorporate some of the above social interactions with use of the external applications. Similar interactions may also be a part of the user experience within other network services.

SUMMARY OF THE DESCRIPTION

Discussed below are systems, apparatuses, and methods for better post suggestion including posts to promote, content of posts, etc. For example, in an embodiment, a social networking system receives a user post from a first user to publish on the user's behalf. After other users have interacted with the post, the social networking system provides suggestions or tips on how to improve future posts. Alternatively, prior to posting on the user's behalf, the social networking system provides a suggestion on how to improve the post before it is published. Exemplary suggestions include using images (pictures), not using all caps, etc.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which:

FIG. 3 illustrates an embodiment of a graphical user interface (GUI) of a page provided by a social networking system to a user;

FIG. 4 illustrates an example of two posts, one that is more likely to not be successful and one that is more likely to be successful;

FIG. 8 illustrates examples of pre-post suggestions;

FIG. 9 illustrates an embodiment of a trigger:suggestion rule set;

DETAILED DESCRIPTION

Social networking systems benefit from techniques that improve an ability of users to share online content with other users of the social networking system. These users may share content by sending or posting electronic messages (posts) to the social networking system for display that include text or images associated with other users of the social networking system. Accordingly, through the use of posts, different users are able to interact with each other. Unfortunately, not all posts have a desired outcome. For example, some posts do not reach the intended audience because of one of several factors including, but not limited to: timing, subject matter, formatting and/or rendering, wrong audience, etc. Discussed below are systems, apparatuses, and methods for better post suggestion including posts to promote, content of posts, etc.

In the following description, numerous specific details are set forth. However, it is understood that embodiments of the invention may be practiced without these specific details. While a social networking system is used to describe embodiments of preview generation for online content, it will be understood that these concepts are generally applicable to generating previews for online content for other network services/entities, websites, etc. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
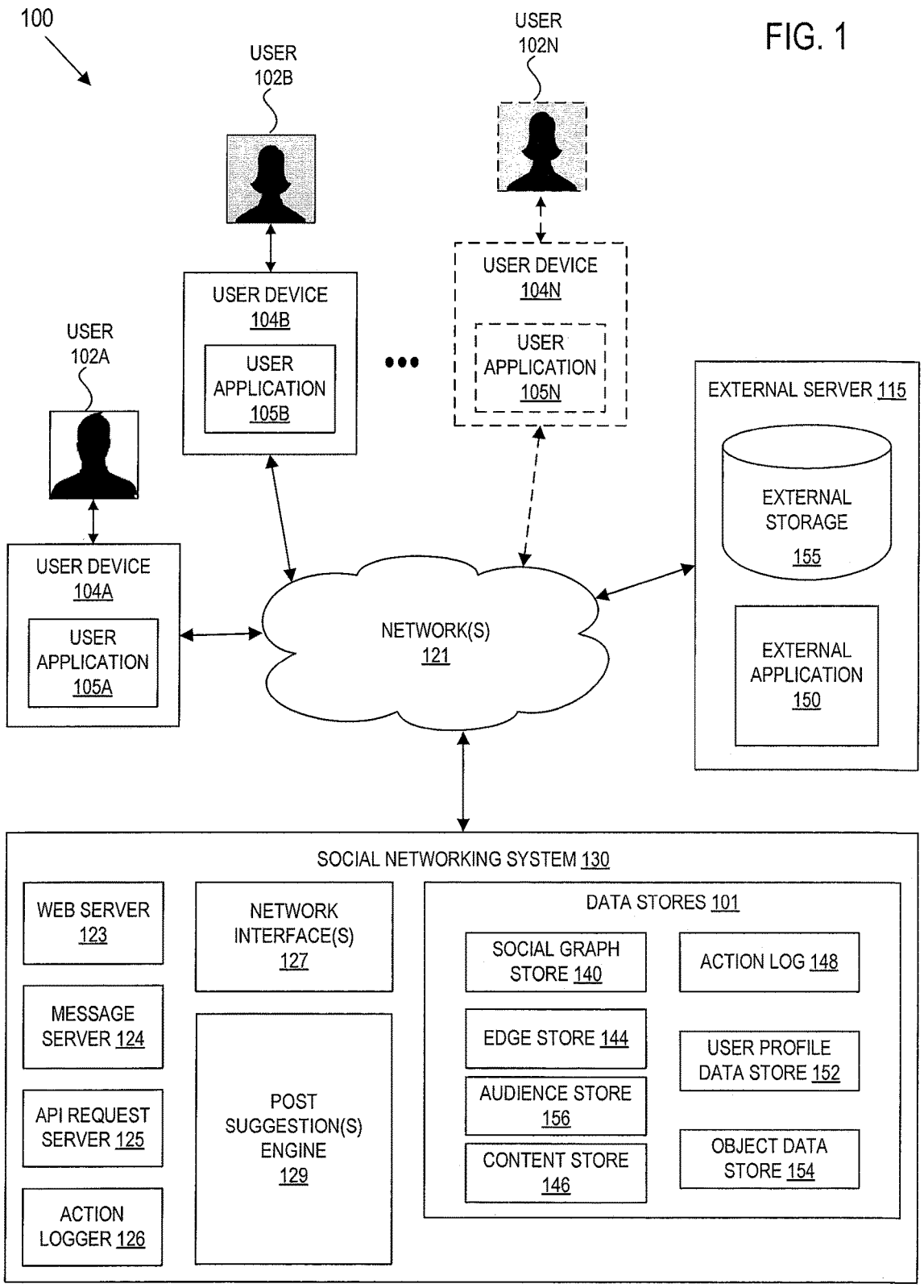
FIG. 1 illustrates an example network environment of a system including a social networking system.

FIG. 1 illustrates an example network environment of a system 100 including a social networking system 130 that offers its users 102A-102N the ability to communicate and interact with other users 102A-102N and entities of the social networking system 130 according to an embodiment of the invention. The illustrated social networking system 130 includes a content creator identification analysis module 129 for automatically identifying content creators from resources shared between users of the social networking system in accordance with an embodiment of the invention.

In some embodiments, the social networking system 130 comprises one or more computing devices storing user profiles associated with users 102A-102N and/or other objects, as well as connections between users and other users 102A-102N and/or objects.

The user devices 104A-104N that are enabled to interact with social networking system 130 can be any type of computing device capable of receiving user input as well as transmitting and/or receiving data via a network (e.g., network 121). For example, the user devices 104A-104N can include conventional computer systems, such as a desktop or laptop computer, or may include devices having computer functionalities such as Personal Digital Assistants (PDA), cellular or mobile telephones, smart-phones, in- or out-of-car navigation systems, gaming devices, or other electronic devices.

In one embodiment, a user device (e.g. 104A) may execute a user application (e.g. 105A) allowing a user 102A of the user device 104A to interact with the social networking system 130. For example, the user application 105A may be a web browser application (e.g., Microsoft Windows Internet Explorer, Mozilla Firefox, Apple Safari, Google Chrome, Opera, etc.). In an embodiment, the user application 105A is a special-purpose client application (e.g., Facebook for iPhone or iPad, etc.), and in an embodiment the user application 105A is the native operating system of the user device 104A, such as Windows®, Mac OSX®, IOS®, or ANDROID™ which may utilize an Application Programming Interface (API) to directly interface with the social networking system 130 through API request server 125.

The user devices 104A-104N are configured to communicate with the social networking system 130 via a network 121 or collection of networks—such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 121 may be wired, wireless, or a combination of both. In one embodiment, the network 121 uses standard communications technologies and/or protocols. Thus, the network 121 may include links using technologies such as Ethernet, Institute of Electrical and Electronics Engineers (IEEE) 802.11, Worldwide Interoperability for Microwave Access (WiMAX), 3G, 4G, Long Term Evolution (LTE), Code-Division Multiple Access (CDMA), Digital Subscriber Line (DSL), cable modems, etc. Similarly, the networking protocols used on the network 121 may include Multiprotocol Label Switching (MPLS), Transmission Control Protocol (TCP), Internet Protocol (IP), TCP/IP, User Datagram Protocol (UDP), Hypertext Transport Protocol (HTTP), Simple Mail Transfer Protocol (SMTP), and/or File Transfer Protocol (FTP). Data exchanged over the network 121 may be represented using technologies and/or formats including Hypertext Markup Language (HTML), Extensible Markup Language (XML), or JavaScript Object Notation (JSON), among other formats. In addition, all or some of links can be encrypted using conventional encryption technologies such as Secure Sockets Layer (SSL), Transport Layer Security (TLS), or Internet Protocol security (IPsec).

The social networking system 130 fundamentally relies upon information representing its users 102A-102N and a set of objects. Users 102A-102N, using the social networking system 130, may add connections to other users or objects of the social networking system 130 to which they desire to be connected, and may also interact with these other users or objects. The users of the social networking system 130 are individuals (e.g. humans), and the objects may include entities (such as businesses, organizations, universities, manufacturers, brands, celebrities, etc.), concepts, or other non-human things including but not limited to a location, an album, an article, a book, a concept, etc.

In some embodiments, the social networking system 130 also allows users to interact with external (e.g., third-party) applications 150 (e.g., websites), external storage 155, and/or external servers 115 (e.g., server end stations).

Based on the stored data about users, objects, and the connections between the users and/or objects, the social networking system 130 generates and maintains a "social graph" in a social graph store 140 comprising a plurality of nodes interconnected by a plurality of edges. Each node in the social graph represents a user or object that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 130 adds, removes, or otherwise modifies edges connecting the various nodes to reflect the interactions.

To provide these functionalities, the embodiment of the social networking system 130 includes an API request server 125, a web server 123, a message server 124, an action logger 126, and a set of data stores 101. This embodiment also includes, within the data stores 101, a social graph store 140 including a node store 142 and an edge store 144, audience store 156, as well as a content store 146, an action log 148, a user profile data store 152, and an object data store 154. In other embodiments, the social networking system 130 may include additional, fewer, or different modules for various applications. Of course, conventional components such as processors, memories, security mechanisms, load balancers, failover servers, management and network operations consoles, and the like are not shown in FIG. 1 so as to not obscure the details of the system.

The social networking system 130 allows its users 102A-102N to communicate or otherwise interact with each other and access content, as described herein. The social networking system 130 stores user profiles in the user profile data store 152. A user profile includes declarative information about the user that was explicitly shared by the user, and may also include profile information inferred by the social networking system 130. In one embodiment, a user profile includes multiple data fields, each data field describing one or more attributes of the corresponding user of the social networking system 130. The user profile information stored in user profile data store 152 describes the users 102A-102N of the social networking system 130, including biographic, demographic, and other types of descriptive information, such as work experience, educational history, gender, relationship status, hobbies, location, other preferences, and the like. The user profile may also store information provided by the user. For example, images or videos provided by the user may also be stored within the user profile. In other embodiments only textual data of the user is stored in the user profile and other data (e.g., images, videos) are stored in multimedia stores and associated with the user (e.g., through associating a user identifier of the user with an image/video identifier of the multimedia content). In certain embodiments, images or videos including or depicting users of the social networking system 130 may be "tagged" with identification information of those users. A user profile in the user profile data store 152 may also maintain references to actions (stored in the user profile or in an action log 148) by the corresponding user performed on content items in a content store 146 and stored in an edge store 144. A user may also specify one or more privacy settings, which are stored in that user's user profile. Privacy settings limit information that the social networking system 130 or other users of the social networking system 130 are permitted to access from that user's user profile.

The web server 123 links the social networking system 130 via the network 121 to one or more user devices 104A-104N by accepting requests for from the user devices 104A-104N and/or transmitting web pages or other web-related content to the user devices 104A-104N, such as image files, audio files, video files, Java applets, Flash, XML, JavaScript, Cascading Style Sheets (CSS), and so forth. The web server 123 in some embodiments is configured to utilize a set of one or more network interfaces 127 to send and receive messages across the network 121. In some embodiments the web server 123 (additionally or alternately) utilizes a message server 124 (e.g., a dedicated server end station, a dedicated software application, etc.) to communicate with the user devices 104A-104N, which is operative to send and/or receive instant messages, queued messages (e.g., email), text and SMS (Short Message Service) messages, or utilize any other suitable messaging technique.

In some embodiments, a message sent by a user to another user by way of the social networking system 130 can be viewed by other users of the social networking system 130, for example, by certain connections of the user (directly connected users in the social graph, other users more than one hop away in the social graph, etc.) receiving the message. An example of a type of message that can be viewed by other users of the social networking system 130 (besides the recipient of the message) is commonly known as a wall post. In some embodiments, a user can send a private message to another user that can only be retrieved by the other user. These messages are stored in storage such as message store 1.

When a user takes an action within the social networking system 130, the action may be recorded in an action log 148 by an action logger 126, subject to any privacy settings and restrictions of the user and/or social networking system 130. In one embodiment, the social networking system 130 maintains the action log 148 as a database of entries. When an action is taken on the social networking system 130, the social networking system 130 can add an entry for that action to the action log 148. In accordance with various embodiments, the action logger 126 is capable of receiving communications from the web server 123 about user actions on and/or off the social networking system 130. The action logger 126 populates the action log 148 with information about those user actions. This information may be subject to privacy settings associated with the user. Any action that a particular user takes with respect to another user is associated with each user's profile, through information maintained in a database or other data repository, such as the action log 148. Examples of actions taken in the social networking system 130 that may be stored in the action log 148 include, but are not limited to, adding a connection to another other user, sending a message to the other user, reading a message from the other user, viewing content (e.g., wall posts, images, videos) associated with or created by the other user, attending an event posted by another user, being tagged in photos with another user, etc. In some embodiments, certain actions are described in connection with more than one user, and these actions may be associated with those users as well and stored in the action log 148.

The action log 148 may be used by the social networking system 130 to track other user actions on the social networking system 130, as well as actions on an external application 150 (e.g., website) that are communicated to the social networking system 130. Users may interact with various objects on the social networking system 130, including commenting on posts, sharing links, and checking-in to physical locations via a mobile device, accessing content items in a sequence or other interactions. Information describing these actions is stored in the action log 148. Additional examples of interactions with objects on the social networking system 130 included in the action log 148 include logging in to the social networking system 130, commenting on a photo album, communications between users, becoming a fan of a musician or brand by "liking" a page of the respective entity, adding an event to a calendar, joining a group, creating an event, authorizing an application, using an application, and engaging in a transaction. Additionally, the action log 148 records a user's interactions with advertisements on the social networking system 130 as well as other applications operating on the social networking system 130. In some embodiments, data from the action log 148 is used to infer interests or preferences of the user, augmenting the interests included in the user profile and allowing a more complete understanding of user preferences.

The API request server 125 allows external systems (e.g., an external application 150 of external server 115, and/or user applications 105A of user devices 104A-104N) to access information from or transmit information to the social networking system 130 by issuing API calls. The information provided by the social networking system 130 may include user profile information or the connection information of users, subject to the individual privacy settings of the user. For example, a system (e.g. external application 150) may send an API request to the social networking system 130 via the network 121 to publish a story on behalf of a user, request information about a user (after having been given permission to do so by the user), upload a photograph on behalf of a user, etc. API requests are received at the social networking system 130 by the API request server 125, which then processes the request by performing actions sought by the API requests, determining appropriate responses to the API requests, and transmitting back these responses back to the requesting application 150 via the network 121.

The content store 146 stores content items associated with user profiles, such as posts, images, videos, and/or audio files. Content items from the content store 146 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users or entities, to invite new users to the system or to increase interaction with the social network system 130 by displaying content related to users, objects, activities, or functionalities of the social networking system 130. Examples of social networking content items include suggested connections or suggestions to perform other actions, media provided to or maintained by the social networking system 130 (e.g., pictures, videos), status messages or links posted by users to the social networking system, events, groups, pages (e.g., representing an organization or commercial entity), and any other content provided by, or accessible via, the social networking system 130.

The content store 146 also includes one or more pages associated with entities included social graph store 140. An entity is a type of object that can be a non-individual user of the social networking system 130, such as a business, a vendor, an organization, or a university. However, in some embodiments of the invention, an entity may represent a celebrity or other well-known individual, and thus an entity object node for a person may exist in the social graph (serving as a "brand" for that individual, and perhaps having an associated page that other users may "like") and also a user node for that same person may also exist in the social graph (serving as a representation for a personal account of that person). A page includes content associated with an entity and instructions for presenting the content to a user of the social networking system 130. For example, a page identifies content associated with the entity's stored content (from the object data store 154) as well as information describing how to present the content to users viewing the page.

In the depicted embodiment, the social networking system 130 includes post suggestion(s) engine 129 to be executed on a processor of the social networking system 130. The post suggestion(s) engine 129 performs one or more functions for providing posting suggestions to a user of the social networking system 130. For example, the post suggestion(s) engine 129 performs one or more of suggesting: 1) content to add to a page (contact information, profile picture, description, a cover photo, etc.); 2) posts to boost (e.g., re-post, pay to have promoted on another user's page, etc.); 3) content of posts; and/or 4) timing of a post.

Figure 2:
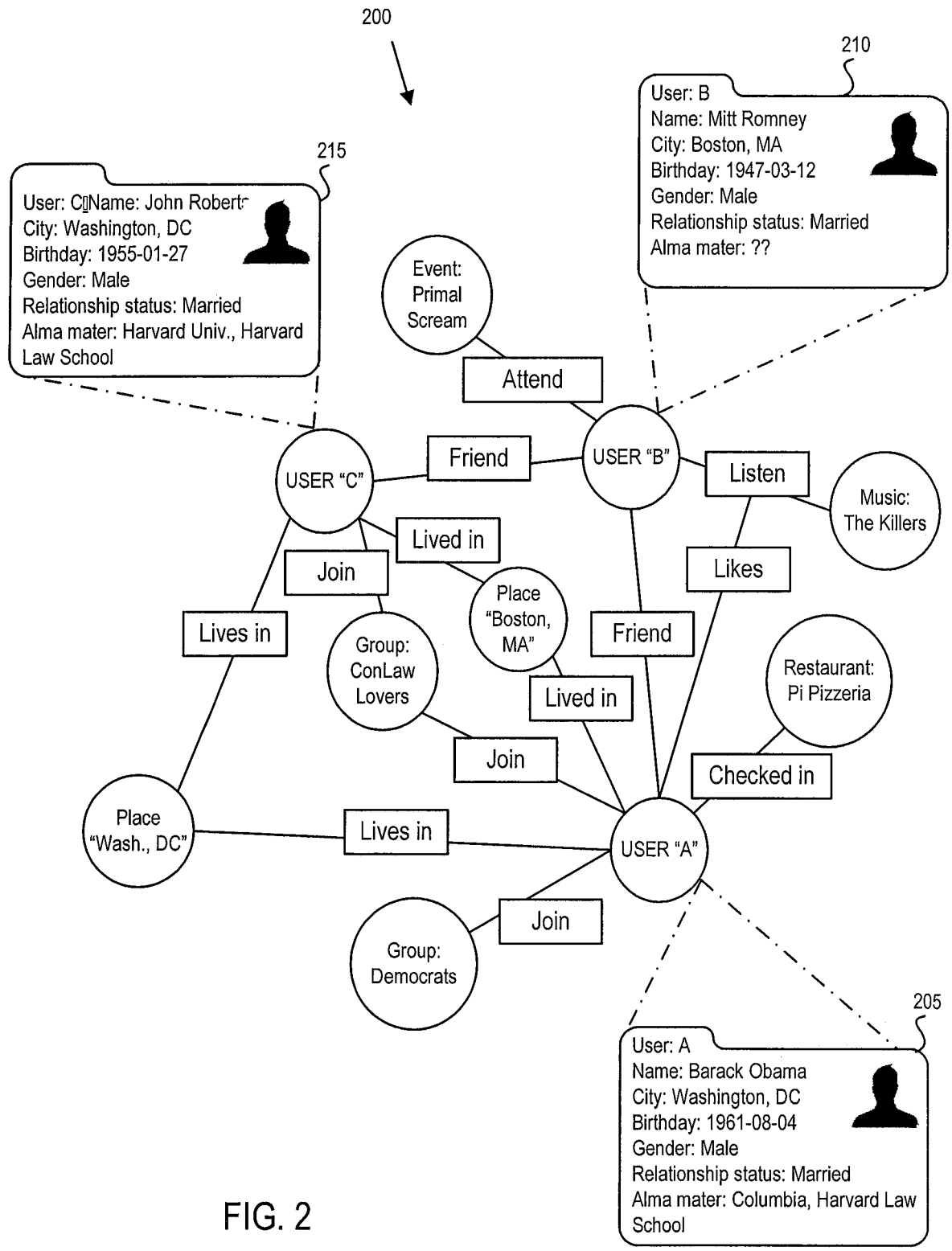
FIG. 2 illustrates exemplary graph of social network data.

FIG. 2 illustrates an exemplary graph 200 of social network data. In graph 200, objects are illustrated as circles and actions are illustrated as labeled connections between circles. Developers of the social network or corresponding social network applications define actions to represent different ways that users may interact with the social network and/or their applications. As users perform actions, connections are made between users and objects. For example, User A has performed a number of actions within the social network, indicating that he previously lived in Boston, currently lives in Washington D.C., joined groups for Democrats and ConLaw Lovers, is following the White Sox, and is friends with User B. User B and User C have also performed a number of actions with respect to objects within graph 200.

In one embodiment, users are able to add demographic information to user profiles 205-215. In one embodiment, for demographic information that has not been entered by a user, a social network application generates an estimate based upon the user's actions, connections, and/or actions of connections. For example, User B has not entered an alma mater into user profile 210. A social network application may determine from User B's contacts, activities, cities of residence, etc. that User B's likely alma mater is one or both of Brigham Young University and Harvard University. In one embodiment, the user profiles 205-210 include additional information, such as relationships to other users, places where the user has worked, user interests, etc.

In one embodiment, users are able to provide feedback on actions of other users/entities. As a result, actions are also viewed as objects that may be acted upon. For example, User B listened to music by the artist, The Killers. As a result, the social networking system publishes a narrative associated with User B (e.g., in a newsfeed, profile of User B, etc.) indicating that User B listened to music by the artist, The Killers. In viewing a newsfeed, profile of User B, or another form of social networking system publication(s), the social networking system displays the narrative to User A. The social networking system then receives input from User A indicating that User A "likes" that User B listened to The Killers.

In one embodiment, demographic data further includes a weight or score indicating an affinity between a user and an object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity than if two users are friends. Additionally, temporal and geographic proximity of actions/users are other exemplary indicators of affinity.

In one embodiment, users may select privacy settings to control what network service data is shared, with whom the data is shared, and/or what data used for selecting candidate objects.

As briefly discussed above, in some embodiments a social networking system provides a suggestion on page content to complete. Typically, this is done by post suggestion(s) engine 129. FIG. 3 illustrates an embodiment of a graphical user interface (GUI) of a page provided by a social networking system to a user. The user that views this page has administrative rights such that he/she may edit the page.

In this GUI, a progress indicator 301 (such as a progress bar) is provided to show the user how much of their profile has been completed. In the illustrated GUI, there are links for actions such as adding a picture 303, adding a cover photo 305, adding a description (of the user, entity, and/or page) 307, and adding contact information 309. In some embodiments, as these actions have been completed by the user through the GUI the color of the links changes (for example, from blue to black) to indicate that they have been completed and the progress bar is increased. In other embodiments, as the actions are completed, the links are removed from the GUI such that they are not highlighted to user.

Figure 6:
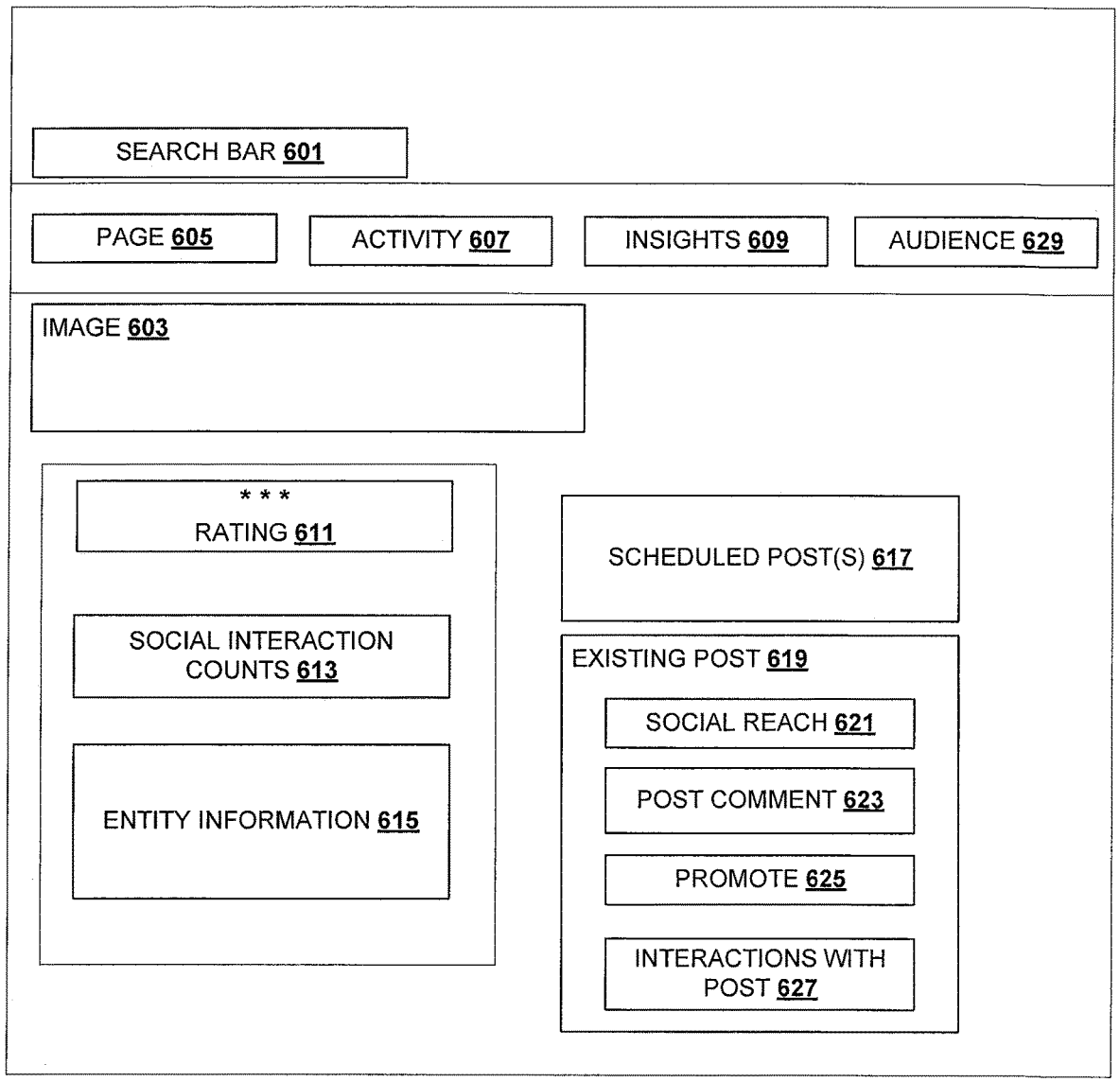
FIG. 6 illustrates an embodiment of page content of a social networking system GUI to be presented to an administrator of the page.

In the illustrated GUI of FIG. 3, page content 311 is also provided. For example, previous posts, information about the page's owner, etc. are shown (a more detailed version of this content is shown in FIG. 6). Highlighted in this illustration is post composer 313 with several different post actions that may be taken by the administrator of the page such as updating status, adding photos/videos, creating an offer, or creating an event. One or more of these actions may be suggested to the user as an action to take to generate more interest in the page or to complete another objective.

After an action has been taken or while a post is being created, a suggestion (or tip) 315 may be provided to guide the administrator as will be detailed below. Because posts have been around for several years, there is historical data on what works and what does not for "successful" posts (those that generate interest, conversation, etc.) that can be used to make these suggestions.

For example, FIG. 4 illustrates an example of two posts, one that is more likely to not be successful and one that is more likely to be successful. In the top post 401, the text is in all capital letters (ALL CAPS) and is very self-serving. As seen by the comment 405, it is generally not an ideal way to generate positive interest. The bottom post 407, however, is more personal to the audience and uses normal characters. Here the comment 411 is more positive. Typically, suggestions are framed as rewards for the immediately completed action coupled with concise suggestions for incremental, attainable improvements in post quality/page content quality as detailed below. Additionally, suggestions are normally related to a triggering posting action (e.g., creates photo post, creates link post, creates status post).

Figure 5:
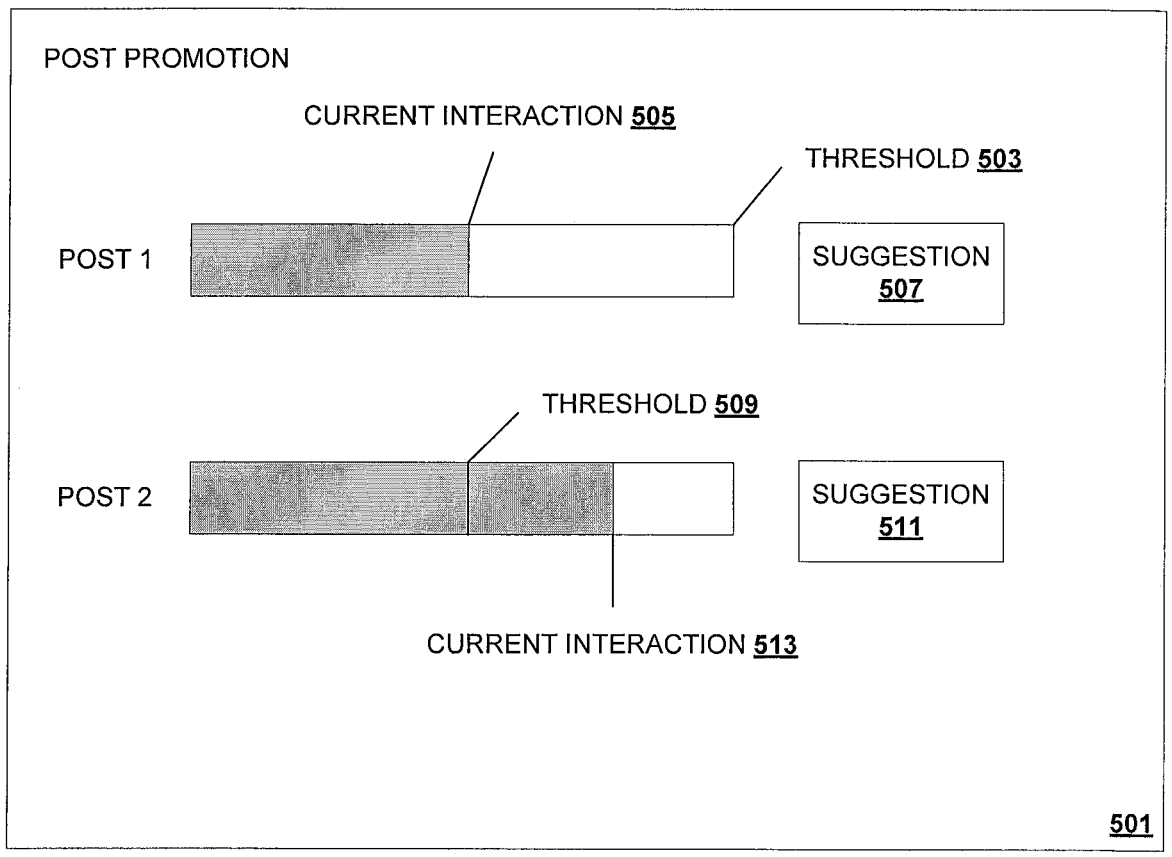
FIG. 5 illustrates an example of a post promotion GUI that would be shown on an administrator's page.

In some systems, posts may be "promoted" or placed higher in other users' feeds. Typically, this comes at a monetary cost. Another type of suggestion that is not content related is to suggest when to promote a post. FIG. 5 illustrates an example of a post promotion GUI that would be shown on an administrator's page. In this example, there are two posts and an indication for each post of a threshold number of interactions 503, 509 such as likes, comments, click-throughs, etc., and a current interaction value 505, 513. Additionally, for each post there is a suggestion 507, 511 regarding whether or not it is suggested to promote the post. This suggestion could be in the form of a color difference in the suggestion. For Post 1 in the illustration, it has not reached the threshold and should not be promoted, whereas Post 2 has reached the threshold. In some embodiments, this threshold is set by the user and in other embodiments, the social networking system provides the threshold based on historical norms.

FIG. 6 illustrates an embodiment of page content of a social networking system GUI to be presented to an administrator of the page. While many different features are shown in this illustration, not all are present depending upon the implementation of the GUI. A search bar 601 is provided to the user of the social networking system for performing searches in the social networking system that are subject, user, or entity based. For example, a user may input a search for a particular entity. That input is received by the social networking system and passed to its search engine.

Typically, page content includes links to different administrative functions such as functions regarding the look of the page 605, activity information regarding the page 607 (such as messages sent to the page, etc.), insights 609 which provides metrics about the page (such as the number of likes, the reach of the page, etc.), and an audience building tool 629 (a tool to define the page's audience by demographic, etc.). In this illustration, the activity page is what is active. When a non-administrator views a corresponding version of this page, these links are not present, nor is other administrative specific functionality such as scheduled post(s) 617 and some information from existing post(s) 619.

Most page information GUIs also show information about the page's owner (such as a person or entity). For example, for entities such as businesses, a rating 611 may be included. Social interaction counts 613 are also typically included in this GUI. In this display the administrator can view such things such as number of follows, likes, comments, etc. for the page. Finally, entity information 615 such as the entity's address, website, phone number, hours, etc. is usually included in the GUI.

As hinted at above, the administrator GUI page may include a display of posts that are scheduled to run in the future 617. For example, an administrator can schedule a post to be available to other users of the social networking system at a particular date and/or time of day. From this display, the administrator may submit a change to the social networking system about these posts.

Finally, the administrator GUI may also include at least one portion dedicated to an existing post 619. In most embodiments, the social reach of the post 621 is shown to the administrator. For example, a number of comments regarding the post, a number of likes, a number of reposts, etc. are shown. The post's content 623 is provided for the administrator, as are comments/interactions with the post 627. Finally, depending upon the implementation, a means for causing the "promoting" of the post 625 as detailed above is provided. In some embodiments, the color of the means for causing the promoting is a first color when the social networking system recommends that the administrator promote the post and a second color when no such recommendation exists. For example, if the post has been interacted with by at least a threshold number of users over defined a period of time then the social networking system may recommend that the administrator promote the existing post.

Figure 7:
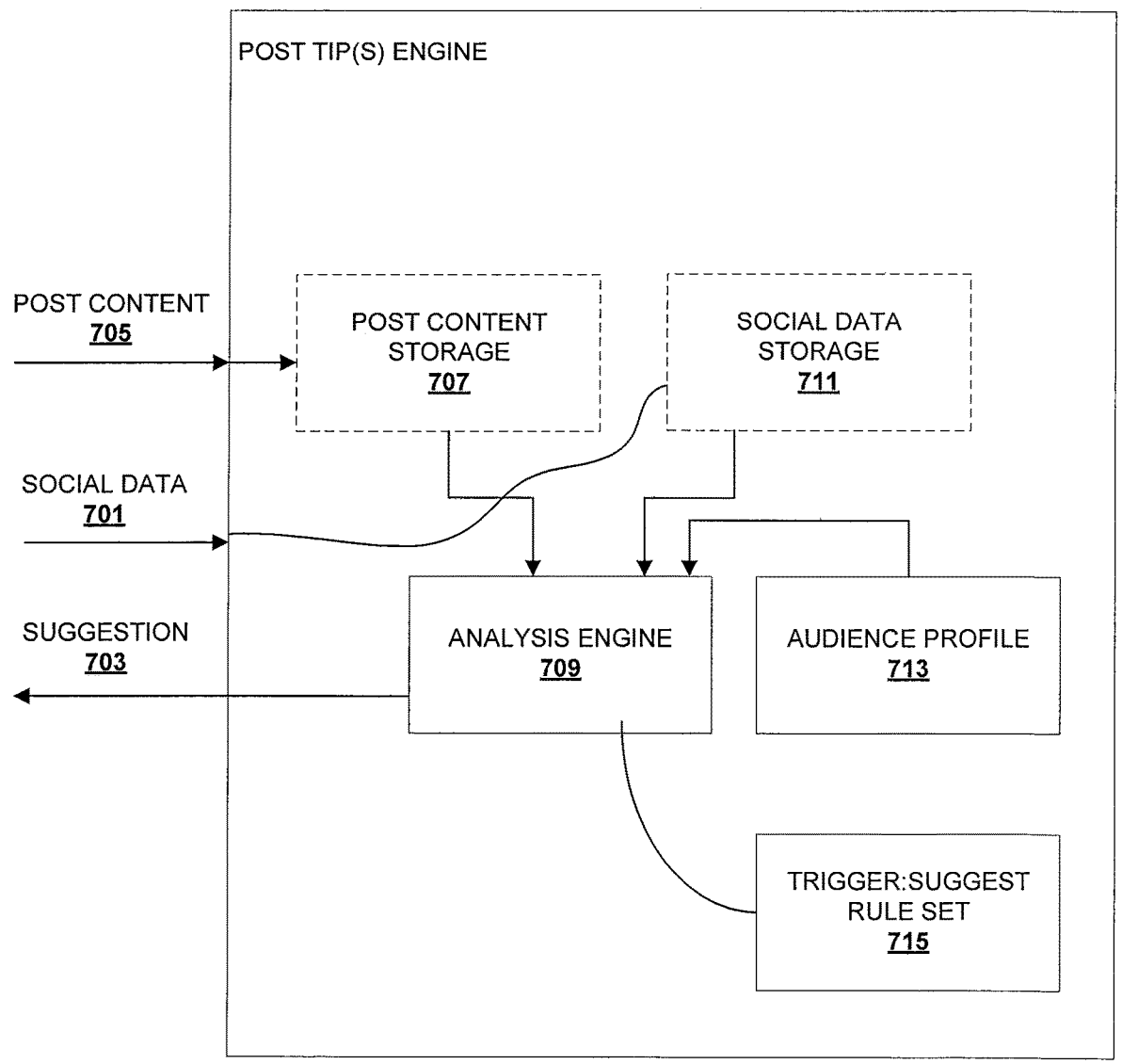
FIG. 7 illustrates an embodiment of a post suggestion(s) engine such as post suggestion(s) engine.

FIG. 7 illustrates an embodiment of a post suggestion(s) engine such as post suggestion(s) engine 129. This engine is capable of providing post and pre-publication suggestions as detailed herein.

This engine includes an analysis engine 709 that uses several different data points to provide suggestions. One of the data points includes post content 705. This content could be pre- or post-publication of a user's post. In some embodiments, the post content 705 also includes post content of other users. Depending upon the implementation, the engine includes storage 707 for the post content, however, this may be external to the engine.

Another data point is social data 701 such as social connections to the user/page. Social data may also include data regarding competitors of the user/page. Depending upon the implementation, the post suggestion(s) engine includes storage 711 for the social data, however, this may be external to the engine.

Audience profile information 713 for the page may also be used by the analysis engine 709 in it suggestion generation.

The analysis engine 709 uses a trigger:suggestion rule set 715 in some embodiments. This rule set 715 stores a mapping between triggers and corresponding actions that are in the form of suggestions that are output 703. Examples of triggers for pre-publication include, but are not limited to, the user typing into a post composer a photo caption or status update, or the user pasting a link into the post composer. Examples of pre-post suggestions are shown in FIG. 8. These suggestions promote brevity, commenting, authenticity, personality, and value propositions.

Examples of triggers for post-publication suggestions include, but are not limited to, the user posting a photograph, creating a first post of a day, creating a status post, creating a generic post, creating a first ever post, etc. Exemplary rewards include complimentary text such as "Great Post!," "Thanks for positing," etc. and may also include suggestions such as those found in FIG. 8.

In some embodiments, suggestions only appear: 1) to users that have pages that were created or resurrected within a set period of time (such as within the last six months); 2) for pages with fewer than a set number of fans (such as fewer than 2,500 fans); 3) for pages in a particular language (such as English); 4) a limited number of times over period of time (e.g., do not appear more than once every two days on a per-administrator basis); 5) to administrators that do not manage more than a set number of pages (e.g., to administrators that manage less than three pages); etc.

FIG. 9 illustrates an embodiment of a trigger:suggestion rule set 715. In this example, a trigger 901 is mapped to at least one suggestion 903. However, as shown, a trigger may have multiple suggestions associated with it.

In addition to the trigger:suggestion mapping, in some embodiments the rule set 715 includes counts to track a number of times that a suggestion has been presented to a user 905 and/or a number of times a trigger has been provided by a user 909. A suggestion count 905 tracks a number of times that a particular suggestion has been provided to the posting user. A trigger count 909 tracks a number of times that a particular trigger has been provided by the posting user. For example, after a suggestion and/or trigger has been used the count value is incremented. In some embodiments, instead of a numerical count value, all that is recorded in the rule set is an indication that a suggestion and/or has been used.

In some embodiments, an indication of if a suggestion should be shown to the user 907 is stored in the rule set. For example, when a user as indicated that either that particular suggestion is not desirable or that all suggestions are not desirable is stored such that a particular suggestion or all suggestions will not be provided by the social networking system.

In some embodiments, the rule set also includes a rating 911 per suggestion. This rating is provided by the posting user upon viewing the suggestion. These ratings may be used by the social networking system in determining which suggestions to provide to a user, class of users (those will similar characteristics such as location, business type, etc.), or users social networking system-wide.

Figure 10:
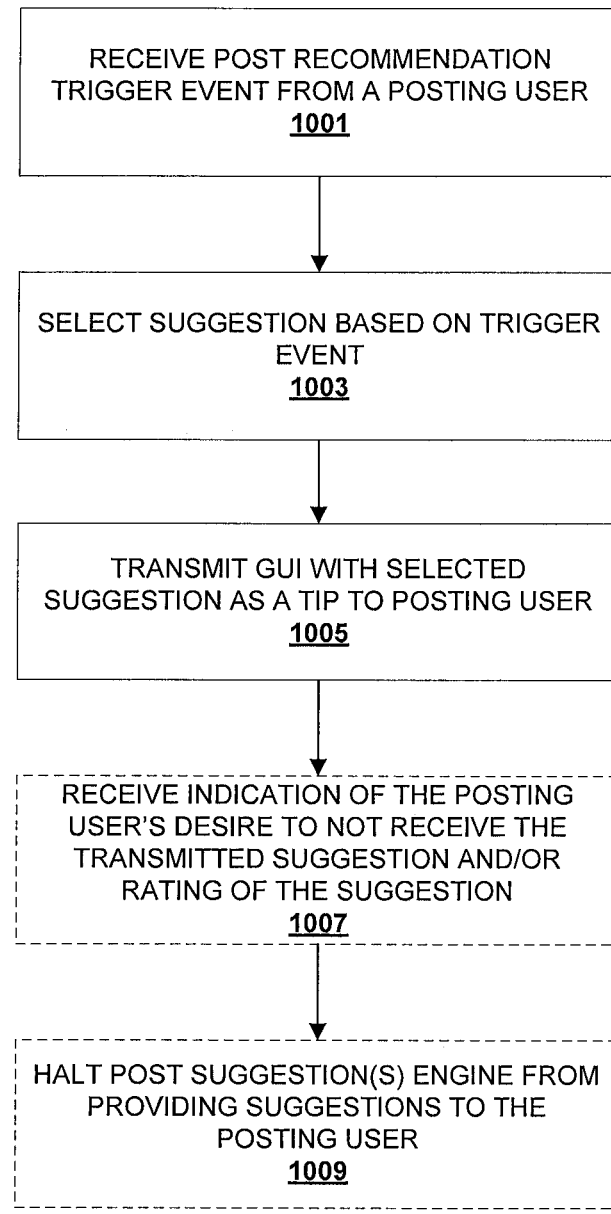
FIG. 10 illustrates an embodiment of a method, for providing suggestions, executed by a social networking system.

FIG. 10 illustrates an embodiment of a method, for providing suggestions, executed by a social networking system. Typically, this method is performed by a post suggestion(s) engine such as that detailed earlier. It is also assumed that a decision on whether or not the user should receive suggestions has already been made.

At 1001, the social networking system receives a post recommendation trigger event from a posting user. Examples of triggers were previously detailed. In most embodiments, this triggering event is received by the social networking system through content entered by the user via a post composer module.

A suggestion (such as a tip) associated with the triggering event is selected at 1003. For example, the analysis engine 709 selects a suggestion from a rule set. In some embodiments, there are multiple mappings of a single triggering event to multiple suggestions. For example, in a first instance of a post without a picture by the posting user a first suggestion to include a photograph may be made, and in a second instance of a post without a picture by the posting user a second suggestion to include a link to the poster's website may be made, etc. In some embodiments, a suggestion is not repeated until all other mapped suggestions have been made. In some embodiments, the social networking system keeps a count of a number of times a particular suggestion has been made such that suggestions that have been provided fewer times are provided before suggestions that have been seen more times.

A GUI with the selected suggestion to the posting user is transmitted from the social network to the posting user at 1005. Exemplary GUIs have been illustrated.

In some embodiments, a suggestion includes a means for the posting user to indicate that the suggestion should not be provided again. At 1007, an indication is received by the posting user of a desire to not receive the suggestion and/or a rating of the suggestion. When a posting user indicates that the suggestion should not be provided, the social networking system will stop providing that suggestion to the posting user. In some embodiments, lower ranked suggestions are not provided to the posting user, the posting user's class of users (those will similar characteristics such as location, business type, etc.), or social networking system-wide.

At 1009, the social networking system halts providing suggestions to the user that are undesired (which may include all suggestions) and/or have a lower rating.

Figure 11:
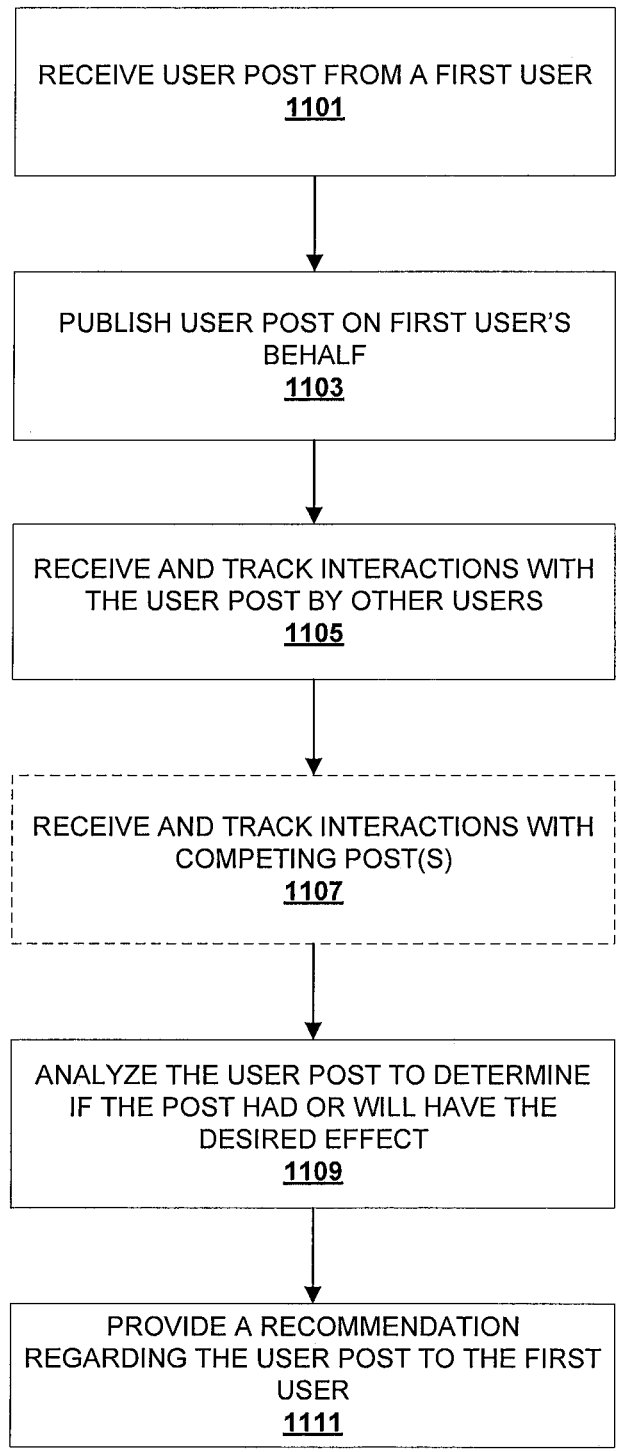
FIG. 11 illustrates an embodiment of a method, for providing suggestions, executed by a social networking system.

FIG. 11 illustrates an embodiment of a method, for providing suggestions, executed by a social networking system. Typically, this method is performed by a post suggestions(s) engine such as that detailed earlier. It is also assumed that a decision on whether or not the user should receive suggestions has already been made.

At 1101, the social networking system receives a user post from a first user. Examples of user posts have been described above, but may include text, images, hyperlinks, etc.

The received user post is published by the social networking system so that it is made available to other users of the social networking system at 1103.

At 1105, interactions by other users with the user post are received and tracked by the social networking system. For example, re-posts, forwards, likes, comments, etc. are received and tracked by the social networking system. In some embodiments, these interactions are stored in content store 146.

In some embodiments, the social networking system receives and tracks interactions by other users with competing posts at 1107. Competing posts may include, for example, posts by entities that compete in the same space as the posting user (e.g., restaurant, movie, music, etc.), posts published around the same time period to a similar audience, etc. In some embodiments, these interactions are stored in content store 146.

The user's post is analyzed in view of the tracked interactions to determine if the posted post had or will have the desired effect (e.g., reaches the desired audience with positive interactions) at 1109. For example, if there are a lot of comments, then the post in most instances as the desired effect. In some embodiments, the posting user sets a threshold of interaction for a post to detail what constitutes an effective post.

When a post does not have the desired effect (e.g., not many comments, likes, etc.), then the social networking system provides a suggestion such as those detailed above with respect to FIG. 10. When posts have desired effect, in addition to providing a suggestion in some embodiments, the social networking system may provide a recommendation to boost a post.

While the above method embodiments have detailed providing suggestions after a post has been published, in some embodiments, a suggestion is provided before a post is published. For example, upon receipt of the post from the posting user, the social networking system provides a suggestion, using for example, the trigger:suggestion rule set 715, before the post is published for other users. In most embodiments where the suggestion is provided prior to publication, post-publication suggestions are still provided where desired.

Figure 12:
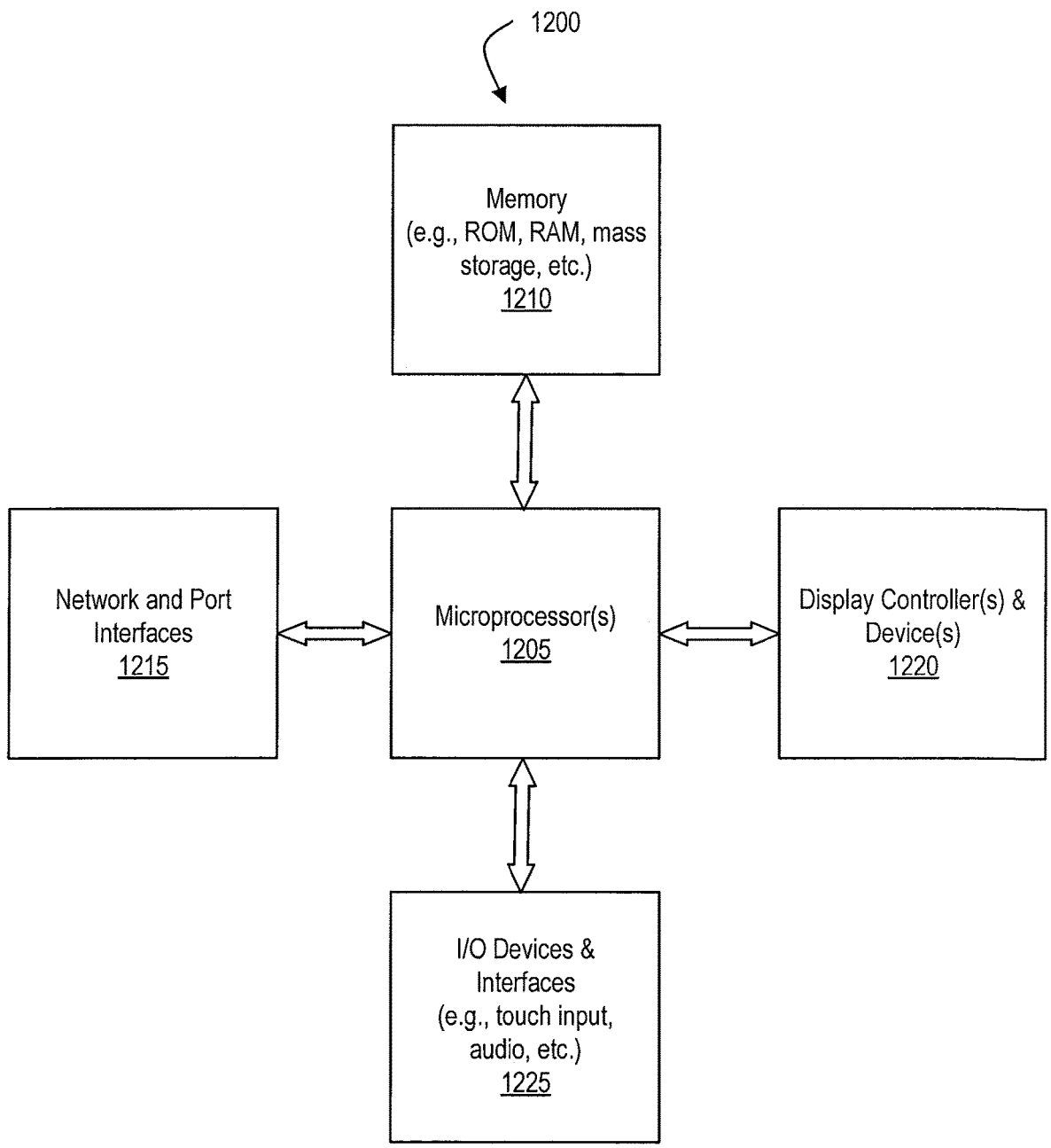
FIG. 12 illustrates, in block diagram form, an exemplary processing system to perform post content suggestions.

FIG. 12 illustrates, in block diagram form, an exemplary processing system to perform post suggestions. In some embodiments, this is a high-level view of social networking system 1130 described herein. Data processing system 1200 includes one or more microprocessors 1205 and connected system components (e.g., multiple connected chips). Alternatively, data processing system 1200 is a system on a chip.

Data processing system 1200 includes memory 1210, which is coupled to microprocessor(s) 1205. Memory 1210 may be used for storing data, metadata, and programs for execution by the microprocessor(s) 1205 including the modules and engines detailed above. For example, memory 1210 may include one or more of the data stores 101 and/or may store modules described herein. Memory 1210 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1210 may be internal or distributed memory.

Data processing system 1200 includes network and port interfaces 1215, such as a port, connector for a dock, or a connector for a USB interface, FireWire, Thunderbolt, Ethernet, Fibre Channel, etc. to connect the system 1200 with another device, external component, or a network. Exemplary network and port interfaces 1215 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 1200 with another device, external component, or a network and receive stored instructions, data, tokens, etc.

Data processing system 1200 also includes display controller and display device 1220 and one or more input or output ("I/O") devices and interfaces 1225. Display controller and display device 1220 provides a visual user interface for the user. I/O devices 1225 allow a user to provide input to, receive output from, and otherwise transfer data to and from the system. I/O devices 1225 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 12.

Data processing system 1200 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 1200 may be a network computer, server, or an embedded processing device within another device or consumer electronic product. As used herein, the terms computer, device, system, processing system, processing device, and "apparatus comprising a processing device" may be used interchangeably with data processing system 1200 and include the above-listed exemplary embodiments.

Additional components, not shown, may also be part of data processing system 1200, and, in certain embodiments, fewer components than that shown in FIG. 12 may also be used in data processing system 1200. It will be apparent from this description that aspects of the inventions may be embodied, at least in part, in software. That is, the computer-implemented method(s) detailed above may be carried out in a computer system or other data processing system 1200 in response to its processor or processing system 1205 executing sequences of instructions contained in a memory, such as memory 1210 or other non-transitory machine-readable storage medium. The software may further be transmitted or received over a network (not shown) via network interface device 1215. In various embodiments, hardwired circuitry may be used in combination with the software instructions to implement the present embodiments. Thus, the techniques are not limited to any specific combination of hardware circuitry and software, or to any particular source for the instructions executed by data processing system 1200.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
receiving a social networking post from a user device associated with a user of a social networking system through a graphical user interface of a social networking application;
analyzing contents of the social networking post to identify a content trigger;
identifying social connections of the user within a social graph of the social networking system comprising object nodes connected by edges to a user node, the object nodes representing non-human objects and the user node representing the user;
identifying a trigger-suggestion-rule set that indicates whether the user has been provided particular suggestions for modifying contents of social networking posts and that maps content triggers to the particular suggestions for modifying contents of social networking posts for the social networking system;
based on the content trigger and the social connections of the user, determining from the trigger-suggestion-rule set a first pre-publication suggestion to modify the contents of the social networking post for posting a status update within a social networking newsfeed and a second pre-publication suggestion to modify the contents of the social networking post for one of creating an event, creating an offer, posting an image, or posting a video within the social networking newsfeed;
providing the first pre-publication suggestion and the second pre-publication suggestion to modify the contents of the social networking post to the user device in a post composer of the graphical user interface, the post composer of the graphical user interface comprising a first action option to incorporate the first pre-publication suggestion for posting the status update within the social networking newsfeed and a second action option to incorporate the second pre-publication suggestion for one of creating an event, creating an offer, posting an image, or posting a video within the social networking newsfeed; and
based on receiving from the user device an indication of a user action corresponding to the first action option to incorporate the first pre-publication suggestion or corresponding to the second action option to incorporate the second pre-publication suggestion, publishing a modified social networking post on behalf of the user for display to users of the social networking system.

2. The computer-implemented method of claim 1, wherein the second pre-publication suggestion comprises a suggestion to modify the contents of the social networking post for creating an event.

3. The computer-implemented method of claim 1, further comprising:
receiving indications of ratings from additional user devices associated with posting users concerning a same suggestion type as the first pre-publication suggestion to modify contents of other social networking posts; and
halting providing the same suggestion type as the first pre-publication suggestion to modify the contents of other social networking posts based on the ratings from the additional user devices associated with the posting users.

4. The computer-implemented method of claim 1, further comprising:
receiving and tracking interactions by other users with competing social networking posts from additional user devices;
analyzing the received and tracked interactions to determine pre-publication suggestions concerning contents of social networking posts using a post suggestion engine; and
determining the first pre-publication suggestion to modify the contents of the social networking post for posting the status update within the social networking newsfeed and the second pre-publication suggestion to modify the contents of the social networking post for one of creating an event, creating an offer, posting an image, or posting a video within the social networking newsfeed based in part on the received and tracked interactions.

5. The computer-implemented method of claim 1, wherein the second pre-publication suggestion comprises a suggestion to modify the contents of the social networking post for creating an offer.

6. The computer-implemented method of claim 1, wherein:
the first pre-publication suggestion to modify the contents of the social networking post comprises a suggestion to include an image as part of the social networking post; and
the second pre-publication suggestion to modify the contents of the social networking post comprises a suggestion to modify a format of the social networking post.

7. The computer-implemented method of claim 1, wherein the trigger-suggestion-rule set further comprises an indication of whether the user has applied the particular suggestions for modifying contents of social networking posts.

8. The computer-implemented method of claim 1, wherein:
receiving the social networking post from the user device associated with the user of the social networking system through the graphical user interface of the social networking application comprises receiving the social networking post via the post composer of the graphical user interface; and
analyzing the contents of the social networking post to identify the content trigger comprises identifying a photo caption, text in all capital letters, a status update, or a link within the post composer as the content trigger.

9. The computer-implemented method of claim 1, wherein:
the trigger-suggestion-rule set further comprises:
suggestion counts tracking a number of times a suggestion type has been provided to the user of the social networking system; and
content trigger counts tracking a number of times a content trigger type has been provided by the user; and
determining the first pre-publication suggestion and the second pre-publication suggestion to modify the contents of the social networking post comprises determining the first pre-publication suggestion and the second pre-publication suggestion in part based on the suggestion counts or the content trigger counts.

10. A non-transitory computer-readable medium storing instructions thereon that, when executed by at least one processor, cause a computer system to:
receive a social networking post from a user device associated with a user of a social networking system through a graphical user interface of a social networking application;
analyze contents of the social networking post to identify a content trigger;
identify social connections of the user within a social graph of the social networking system comprising object nodes connected by edges to a user node, the object nodes representing non-human objects and the user node representing the user;
identify a trigger-suggestion-rule set that indicates whether the user has been provided particular suggestions for modifying contents of social networking posts and that maps content triggers to the particular suggestions for modifying contents of social networking posts for the social networking system;
based on the content trigger and the social connections of the user, determine from the trigger-suggestion-rule set a first pre-publication suggestion to modify the contents of the social networking post for posting a status update within a social networking newsfeed and a second pre-publication and a second pre-publication suggestion to modify the contents of the social networking post for one of creating an event, creating an offer, posting an image, or posting a video within the social networking newsfeed;
provide the first pre-publication suggestion and the second pre-publication suggestion to modify the contents of the social networking post to the user device in a post composer of the graphical user interface, the post composer of the graphical user interface comprising a first action option to incorporate the first pre-publication suggestion for posting the status update within the social networking newsfeed and a second action option to incorporate the second pre-publication suggestion for one of creating an event, creating an offer, posting an image, or posting a video within the social networking newsfeed; and
based on receiving from the user device an indication of a user action corresponding to the first action option to incorporate the first pre-publication suggestion or corresponding to the second action option to incorporate the second pre-publication suggestion, publish a modified social networking post on behalf of the user for display to users of the social networking system.

11. The non-transitory computer-readable medium of claim 10, wherein the second pre-publication suggestion comprises a suggestion to modify the contents of the social networking post for creating an event.

12. The non-transitory computer-readable medium of claim 10, further comprising instructions that, when executed by the at least on processor to:
receive indications of ratings from additional user devices associated with posting users concerning the particular suggestions for modifying contents of social networking posts; and
include within the trigger-suggestion-rule set the ratings concerning the particular suggestions for modifying contents of social networking posts.

13. The non-transitory computer-readable medium of claim 10, wherein the second pre-publication suggestion comprises a suggestion to modify the contents of the social networking post for creating an offer.

14. The non-transitory computer-readable medium of claim 10, wherein:
the first pre-publication suggestion to modify the contents of the social networking post comprises a suggestion to include an image as part of the social networking post; and
the second pre-publication suggestion to modify the contents of the social networking post comprises a suggestion to modify a format of the social networking post.

15. A system comprising:
at least one processor;
at least one non-transitory computer readable storage medium storing instructions that, when executed by the at least one processor, cause the system to:
receive a social networking post from a user device associated with a user of a social networking system through a graphical user interface of a social networking application;
analyze contents of the social networking post to identify a content trigger;
identify social connections of the user within a social graph of the social networking system comprising object nodes connected by edges to a user node, the object nodes representing non-human objects and the user node representing the user;
identify a trigger-suggestion-rule set that indicates whether the user has been provided particular suggestions for modifying contents of social networking posts and that maps content triggers to the particular suggestions for modifying contents of social networking posts for the social networking system;
based on the content trigger and the social connections of the user, determine from the trigger-suggestion-rule set a first pre-publication suggestion to modify the contents of the social networking post for posting a status update within a social networking newsfeed and a second pre-publication and a second pre-publication suggestion to modify the contents of the social networking post for one of creating an event, creating an offer, posting an image, or posting a video within the social networking newsfeed;
provide the first pre-publication suggestion and the second pre-publication suggestion to modify the contents of the social networking post to the user device in a post composer of the graphical user interface, the post composer of the graphical user interface comprising a first action option to incorporate the first pre-publication suggestion for posting the status update within the social networking newsfeed and a second action option to incorporate the second pre-publication suggestion for one of creating an event, creating an offer, posting an image, or posting a video within the social networking newsfeed; and
based on receiving from the user device an indication of a user action corresponding to the first action option to incorporate the first pre-publication suggestion or corresponding to the second action option to incorporate the second pre-publication suggestion, publish a modified social networking post on behalf of the user for display to users of the social networking system.

16. The system of claim 15, further comprising instructions that, when executed by the at least one processor, cause the system to provide the user device for display within the graphical user interface a promotion suggestion to promote the social networking post with prioritized placement within social networking newsfeeds.

17. The system of claim 15, further comprising instructions that, when executed by the at least one processor, cause the system to:
receive and track interactions by other users with competing posts from additional user devices; and
generate the trigger-suggestion-rule set based in part on the received and tracked interactions.

18. The system of claim 15, wherein the second pre-publication suggestion comprises a suggestion to modify the contents of the social networking post for creating an event.

19. The system of claim 15, wherein:
the first pre-publication suggestion to modify the contents of the social networking post comprises a suggestion to include a question; and
the second pre-publication suggestion to modify the contents of the social networking post comprises a suggestion to shorten a text of the social networking post.

20. The system of claim 15, wherein:
the first pre-publication suggestion to modify the contents of the social networking post comprises a suggestion to include an image as part of the social networking post; and
the second pre-publication suggestion to modify the contents of the social networking post comprises a suggestion to include a link and a short caption for the link within the social networking post.

* * * * *